(12) United States Patent
Yamagishi et al.

(10) Patent No.: US 6,397,153 B1
(45) Date of Patent: May 28, 2002

(54) TESTING SYSTEM AND TESTING METHOD FOR STRUCTURE

(75) Inventors: Wataru Yamagishi, Abiko; Toshihiko Horiuchi, Ushiku; Masahiko Inoue, Ibaraki-Ken; Kazuhiro Umekita, Tsuchiura; Yasuyuki Momoi, Ushiku, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/339,874

(22) Filed: Jun. 25, 1999

(30) Foreign Application Priority Data

Jun. 25, 1998 (JP) .......................................... 10-178383

(51) Int. Cl.$^7$ ........................ G01M 10/00; G01H 11/00
(52) U.S. Cl. ............................. 702/42; 702/33; 702/56; 700/30; 73/662; 73/663
(58) Field of Search .......................... 702/42, 56, 33, 702/35, 113; 73/662, 663, 778, 786, 664; 700/29, 30, 60, 61

(56) References Cited

U.S. PATENT DOCUMENTS 5,388,056 A * 2/1995 Horiuchi et al. .............. 702/56
5,737,239 A * 4/1998 Horiuchi et al. .............. 702/56

FOREIGN PATENT DOCUMENTS

JP  A-7-55630  3/1995

\* cited by examiner

Primary Examiner—Marc S. Hoff
Assistant Examiner—Hien Vo
(74) Attorney, Agent, or Firm—Crowell & Moring LLP

(57) ABSTRACT

The present invention discloses a testing system and a testing method for a structure which tests a structure made of a test piece structure and a numerical model virtually connected to the structure. A simulated structure including a frame, an actuator and a reaction force measuring device is mounted on a foundation on which a shaking table is also mounted. Only the test piece structure is mounted on the shaking table. The motion of the shaking table 5 which is generated at the time of shaking the test piece structure using the shaking table and the actuator is measured by a shaking table motion measuring device, while the reaction force generated by the test piece structure is measured by a reaction force measuring device. Using these measured values and the numerical model stored in a digital computer, the motion of the test piece structure after a predetermined period for the motion of the simulated structure is calculated. The actuator and the shaking table are driven so as to make this calculated motion.

9 Claims, 9 Drawing Sheets

TESTING SYSTEM AND TESTING METHOD FOR STRUCTURE

This application claims the priority of Ser. No. 10-178383, filed Jun. 25, 1998, the disclosures of which is expressly incorporated by reference herein.

BACKGROUND OF THE INVENTION

The present invention relates to a testing system and a testing method for a structure, and more particularly to a testing system and a testing method for a structure which can be preferably used for an earthquake resistance test.

To evaluate the earthquake resistance of a structure, it becomes necessary to evaluate not only the linear deformation of the structure but also the non-linear deformation and the rupture phenomenon of the structure. For this purpose, a testing method where a test is carried out by combining the simulation of the behavior of the structure using a computer and a shaking test which actually shakes a test piece using a shaking table and an actuator has been put into practice. This testing method has an advantage that it can carry out the test using the test piece which has a size close to a size of an actual structure. However, since both the actuator and the test piece are mounted on the shaking table, the actual situation is that the test piece which is mounted on the shaking table must be small-sized compared to the size of the shaking table. Conventionally, at the time of testing a structure, the test piece, the actuator for shaking the test piece and a reaction wall for the actuator are all mounted on the shaking table. Such an example is described in JP-A-7-55630.

As described above, in the test which combines the simulation using the computer and the shaking test which tests the actual test piece using the shaking table and the actuator, the test can be carried out using the test piece having the size similar to that of the actual structure. However, in the testing method described in the known example which mounts the reaction wall for the actuator on the shaking table the part of the shaking table is occupied by this reaction wall. Accordingly, only the remaining part of the shaking table can be used for the test piece so that such a method is less optimal in view of the effective use of the shaking table. Therefore, the advantage that the large structure can be tested is hampered and thus reducing the space for the reaction wall is required in terms of the preparation of the expensive shaking table facilities.

SUMMARY OF THE INVENTION

The present invention has been made to solve the above mentioned. inconveniences and it is an object of the present invention to provide a testing system and a testing method which can sufficiently make use of the size of the shaking table and can carry out a test on a test piece having a size close to a size of an actual structure.

It is another object of the present invention to provide a testing system and a testing method for a structure which can make use of an entire space of the shaking table. Furthermore, the present invention can achieve the above objects with a simple constitution without adding any comprehensive modifications to a shaking table device. According to one aspect of the present invention to achieve the above objects, a testing system is disclosed for which tests a structure made of a partial structure and a numerical model virtually connected to this partial structure. The test system includes a shaking table on which the partial structure is mounted. A simulated structure is also provided and includes an actuator for shaking the partial structure. A reaction force measuring means measures a reaction force received from the partial structure when the partial structure is shaken. A digital computer calculates the motion of the numerical model based on the measured values of the reaction force measuring means and generates a shaking signal for the actuator based on the calculated result. The shaking table and the simulated structure are mounted on a same foundation.

According to another aspect of the present invention the testing system comprises a shaking table which is mounted on a foundation by way of a first actuator. A simulated structure having at least one second actuator which is fixedly mounted on a foundation which is common to the foundation on which the shaking table is mounted. A reaction force measuring device measures a reaction force generated by a test piece structure connected to the simulated structure. A digital computer stores a numerical model virtually connected to the test piece structure. A controller which controls the simulated structure and a shaking table motion measuring device measures the motion of the shaking table.

In a preferred embodiment the digital computer outputs a control signal to the controller based on outputs of the shaking table motion measuring device and the reaction force measuring device. It is also preferable that the digital computer calculate the motion of the test piece structure based on the output of the reaction force measuring device and the numerical model, and includes an adder which adds the calculated result and the output of the shaking table motion measuring device, and outputs the added result to the controller.

Yet further the digital computer may stored the shaking wave form of the shaking table, and outputs a control signal to the controller based on the output of the reaction force measuring device. The digital computer includes time control means which controls a shaking timing of the shaking table.

It has a plurality of degrees of freedom further preferable that the simulated structure is for shaking.

It is also preferable that the digital computer includes memory means to which the numerical model is inputted, structure motion calculating means which calculates the motion of the structure after a predetermined period from the time when the reaction force is measured based on the outputs of the reaction force measuring device and the shaking table motion measuring device with reference to the numerical model stored in the memory means. A shaking signal calculating means calculates a shaking signal to be given to the actuator after a predetermined period based on the calculated motion of the structure, and time control means which controls the predetermined time.

Futhermore, the digital computer may include means for storing the shaking wave form of the shaking table, while the time control means controls the shaking timing of the shaking table based on this stored shaking wave form.

According to another aspect of the present invention a testing method for a structure is disclosed which tests a structure made of a partial structure and a numerical model virtually connected to this partial structure. The partial structure is mounted on a shaking table and is shaken by the shaking table. An actuator is fixedly mounted on the same foundation on which the shaking table is mounted. A reaction force generated by the partial structure and a displacement of the shaking table this then measured and a motion of a joint between the numerical model and partial structure after a predetermined period from the time when the reaction force is measured is obtained based on the measured values of the reaction force and the displacement of the shaking table. A shaking signal is inputted to the actuator for realizing the obtained motion at the joint after a lapse of the predetermined time and the actuator shakes the partial structure based on this signal.

According to another aspect of the present invention a testing method is disclosed for a structure made of a test piece structure mounted on a shaking table and a numerical model virtually connected to the test piece structure and stored in a digital computer. A step is included in which the test piece structure is shaken by the shaking table and an actuator fixedly mounted on a foundation on which the shaking table is mounted, and a reaction force generated by the test piece structure is measured. In a further step a displacement of the shaking table is measured. The measured value of the reaction force displacement of the shaking table is inputted to the digital computer. In a future step a relative motion of the structure to the shaking table after a predetermined period from the time when the reaction force as measured is calculated from the measured value of the reaction force with reference to the numerical model. In a subsequent step a relative motion of the structure to the foundation for the shaking table after a predetermined period from the time when the reaction force is measured is calculated by adding the calculated result of the relative motion of the structure and the measured value of the displacement of the shaking table. Thereafter a shaking signal which makes the motion obtained by the calculation at a portion of the test piece structure to be shaken by the actuator is calculated. The shaking signal is outputted after a predetermined period from the time when the reaction force is measured, and a step in which the actuator is driven based on the shaking signal are carried out in sequence.

According to another aspect of the present invention a testing method is disclosed for a structure made of a test piece structure mounted on a shaking table and a numerical model virtually connected to the test piece structure and stored in a digital computer. The test piece structure is shaken using the shaking table and an actuator fixedly mounted on a foundation on which the shaking table is mounted. A reaction force generated by the test piece structure is measured and inputted to the digital computer while a relative motion between the structure and the shaking table after a predetermined period from the time when the reaction force is measured is calculated using the measured value of reaction force with reference to the numerical model. A relative motion of the structure to the foundation for the shaking table after a predetermined period from the time when the reaction force is measured is calculated by adding the calculated result of the relative motion of the structure and a preliminarily obtained displacement of the shaking table. A shaking force given to the test piece for making the calculated motion after the predetermined period is obtained, and this shaking force is generated by the actuator.

The preliminarily obtained displacement of the shaking table is preferably measured at the time of measuring the reaction force or prestored in the digital computer. It is also preferable that the preliminarily obtained displacement of the shaking table is the value measured at the time of measuring the reaction force. After calculating the relative motion between the structure and the shaking table which is carried out after a predetermined period from the time when the reaction force is measured, when the motion of the structure relative to the foundation for the shaking table after a predetermined period is to be obtained, a prestored shaking wave form of the shaking table is used. The time lag is calculated from the difference between the measured value of the motion of the shaking table and the prestored wave form and the predetermined period is adjusted based on the time lag to correct the predetermined period.

DETAILED DESCRIPTION OF THE DRAWINGS

An embodiment of the present invention is hereinafter explained in conjunction with attached drawings.

Figure 1:
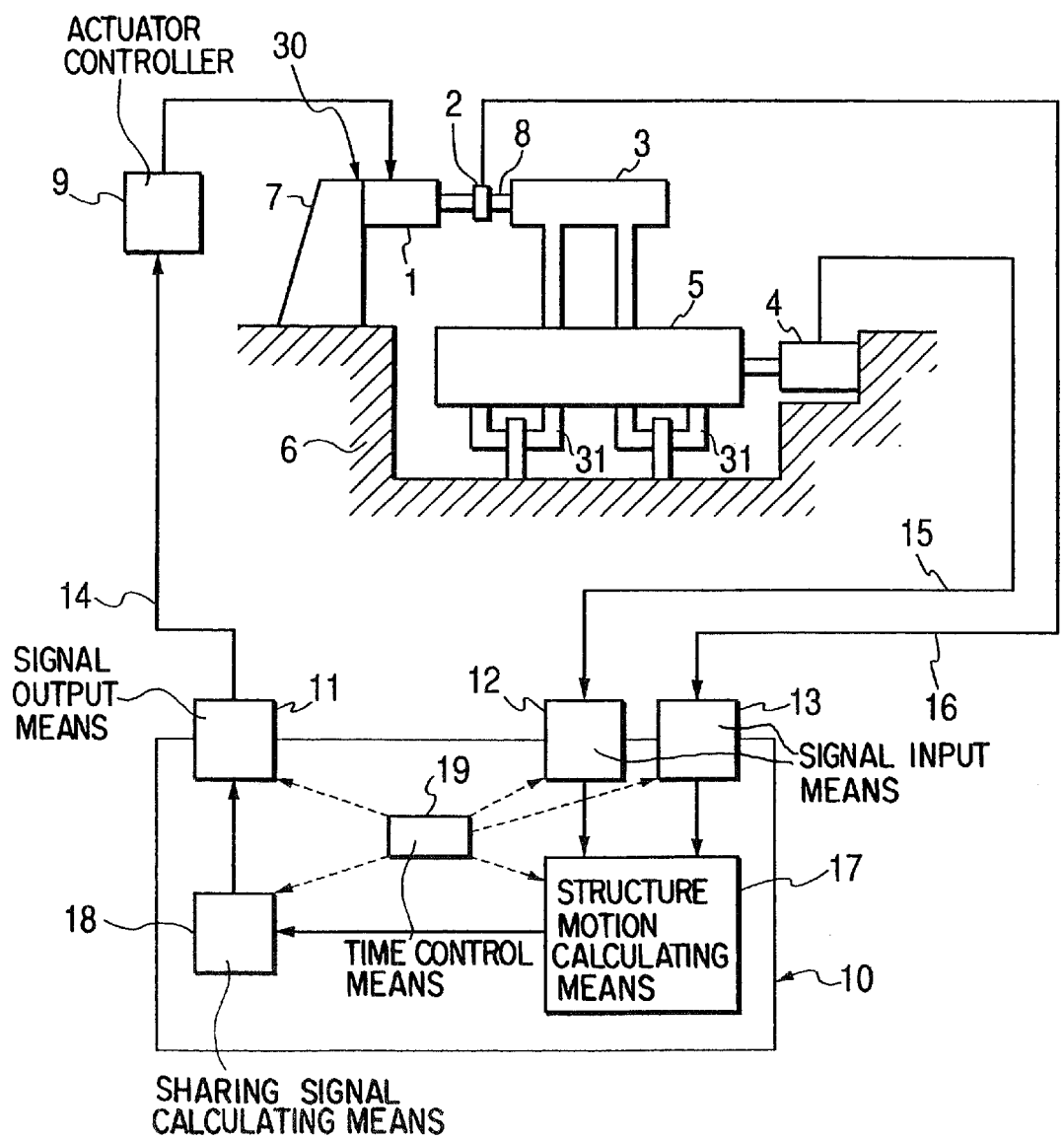
FIG. 1 is a schematic view of one embodiment of the shaking test system of the present invention.

FIG. 1 is a block diagram relating to one embodiment of a shaking testing system for a structure according to the present invention. For instance, to examine the behavior of a bridge girder at the time of an occurrence of an earthquake, it is impossible to examine the whole bridge girder. Accordingly, a method which cuts out a part of the bridge girder as a test piece and analyzes the remaining portion of the bridge girder numerically taking into account that the behavior of the motion of the remaining portion has a strong linearity is used. In such a case, a test piece structure 3 has one end thereof fixedly mounted on a shaking table 5 and the other end thereof connected to a frame 8 provided to a front end portion of an actuator 1. The remaining portions of the test piece structure 3 are not connected to any other members. Here, the actuator 1 is mounted on a rigid wall 7 which is fixedly mounted on a foundation 6 on which the shaking table 5 is also mounted. The actuator 1, the frame 8 and a reaction force measuring device 2 constitute a simulated structure. The reaction force measuring device 2 measures the reaction force applied to the test piece structure 3 by shaking. So long as the reaction force can be measured, the location of the reaction force measuring device 2 is not limited to a position shown in FIG. 1.

The shaking table 5 is shaken in upper and lower directions by means of actuators 31, while the shaking table 5 is shaken in horizontal direction consisting of an X direction and a Y direction by means of actuators not shown in drawings. When the shaking table 5 is shaken by these actuators, the reaction force loaded to the reaction force measuring device 2 from the test piece structure 3 is transmitted to signal input means 13 by way of signal transmission means 16 and eventually is inputted to a digital computer 10. When the shaking table 5 is shaken, a motion value of the shaking table 5 measured by a shaking table motion measuring device 4 is transmitted to signal input means 12 by way of signal transmitting means 15 and this value is also inputted to the digital computer 10. A shaking signal is transmitted from a signal output means 11 which includes the digital computer 10 to an actuator controller 9 byway of signal transmission means 14. The simulated structure is driven by this shaking signal. In case the shaking of the shaking table 5 in upper and lower directions is not necessary, the actuators 31, may be replaced by a support device which can support the shaking table 5 in upper and lower directions.

In the above-mentioned constitutional components, to be more specific, the transmission signals are voltage signals, the signal transmission means are cables, the signal input device is an A/D converter and the signal output device is a D/A converter. However, the above-mentioned constitutional elements are not limited to these parts but may be made of other ways.

In the digital computer 10, the measured value of the motion of the shaking table 5 and the measured value of the reaction force which are inputted from the signal input means 12 and the signal input means 13 respectively are outputted to structure motion calculating means 17. A numerical model is inputted and stored in the structure motion calculating means 17. This numerical model is a virtual structure connected to the test piece structure 3 and is made of a matrix of coefficients and various constants of equations of motions and can be preliminarily obtained by an auxiliary device of the digital computer not shown in drawings.

The structure motion calculating means 17 numerically integrates the equations of motion with the measured value of the reaction force as an external force using the numerical model. Thus, the condition of the relative motion between the numerical model and the shaking table is obtained by calculation. By combining the calculated result and the measured value of motion of the shaking table 5, the condition of the motion of the numerical model relative to the foundation 6 after a given period or a predetermined period from the time when the reaction force is measured is obtained. Although the central difference method can be preferably used as the numerical integration, the numerical integration is not limited to such a method.

This calculated result is inputted to shaking signal calculating means 18 and a shaking signal to the actuator 1 is generated such that after a given period or a predetermined period, the motion of a joint between the test piece structure 3 and the simulated structure 30 coincides with the result calculated by the structure motion calculating means 17. This shaking signal is outputted from signal output means 11. The digital computer 10 is controlled by time control means 19 such that the prediction of motion calculation of the test piece structure after a lapse of a given time or a predetermined time is actually obtained after the given time or the predetermined time.

According to the present embodiment, even when the actuator is not mounted on the shaking table, an experiment can be carried out by employing the simulation and the numerical calculation and hence, the experiment which makes full use of the size of the shaking table becomes possible.

Figure 2:
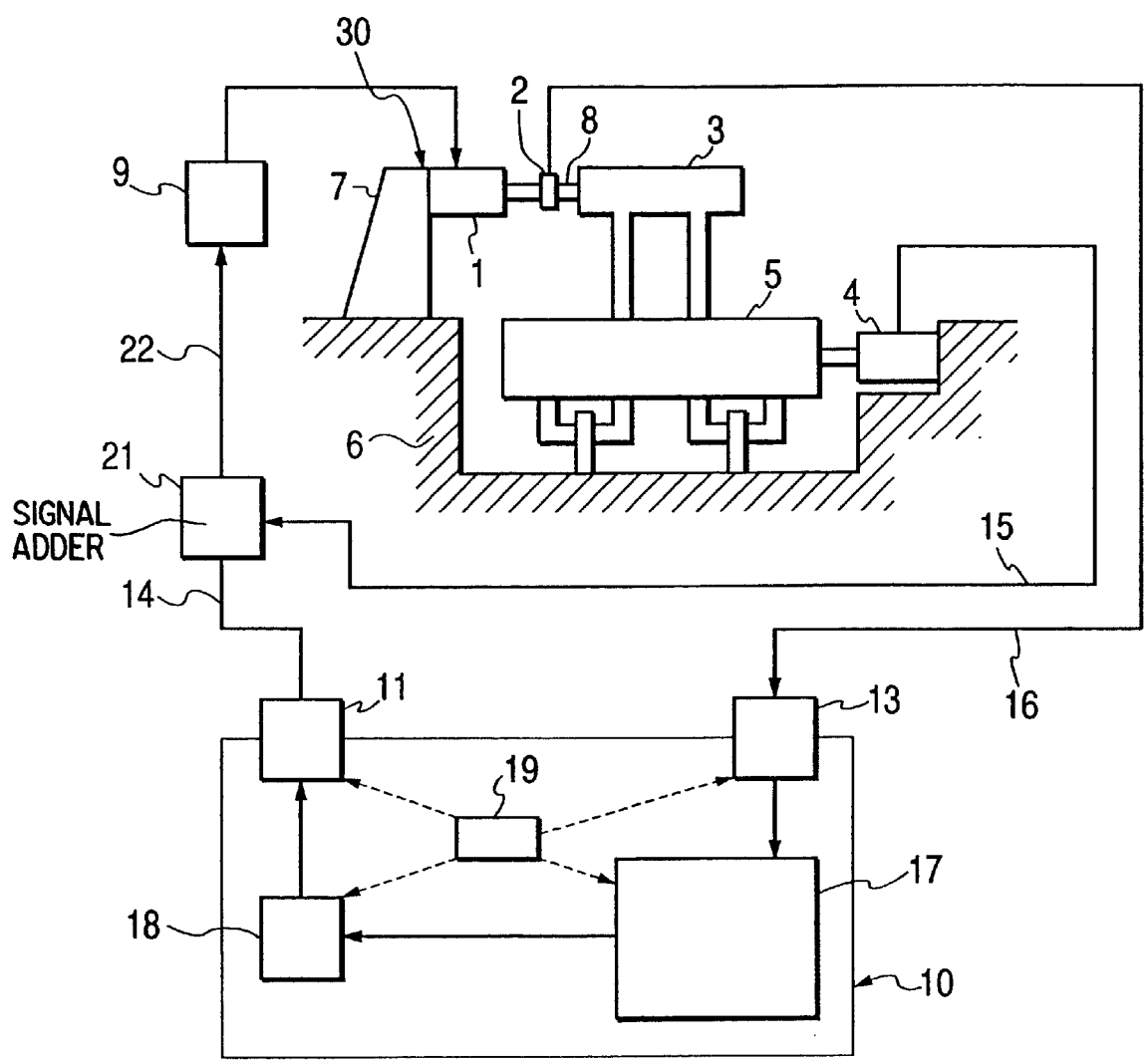
FIG. 2 to FIG. 4 are schematic views of modifications thereof.

A modification of the above-mentioned invention is explained using a block diagram shown in FIG. 2.

In the embodiment shown in FIG. 1, the signal measured by the measuring device 4 which measures the motion of the shaking table 5 is inputted to the signal input means 12. However, in this modification, the signal is directly inputted to a signal adder 21 which is disposed between the signal output means 11 and the controller 9 for the actuator 1. This modification is different from the embodiment shown in FIG. 1 on this point. Accordingly, the same parts which appear in the embodiment shown in FIG. 1 are given the same symbols. In the signal adder 21, based on the measured value of the motion of the shaking table 5 measured by the measuring device 4, the measured signal is converted to a shaking signal which makes the motion of the measured values. Parallel with the above operation, a shaking signal transmitted from the digital computer 10 by way of the signal transmission means 14 is added to the previous shaking signal and its output signal is inputted to the controller 9 for the actuator 1 by way of the signal transmission means 22.

According to this modification, even when the actuator is not mounted on the shaking table, the testing of a structure becomes possible by the combined use of the conventional simulation and the numerical calculation.

Figure 3:
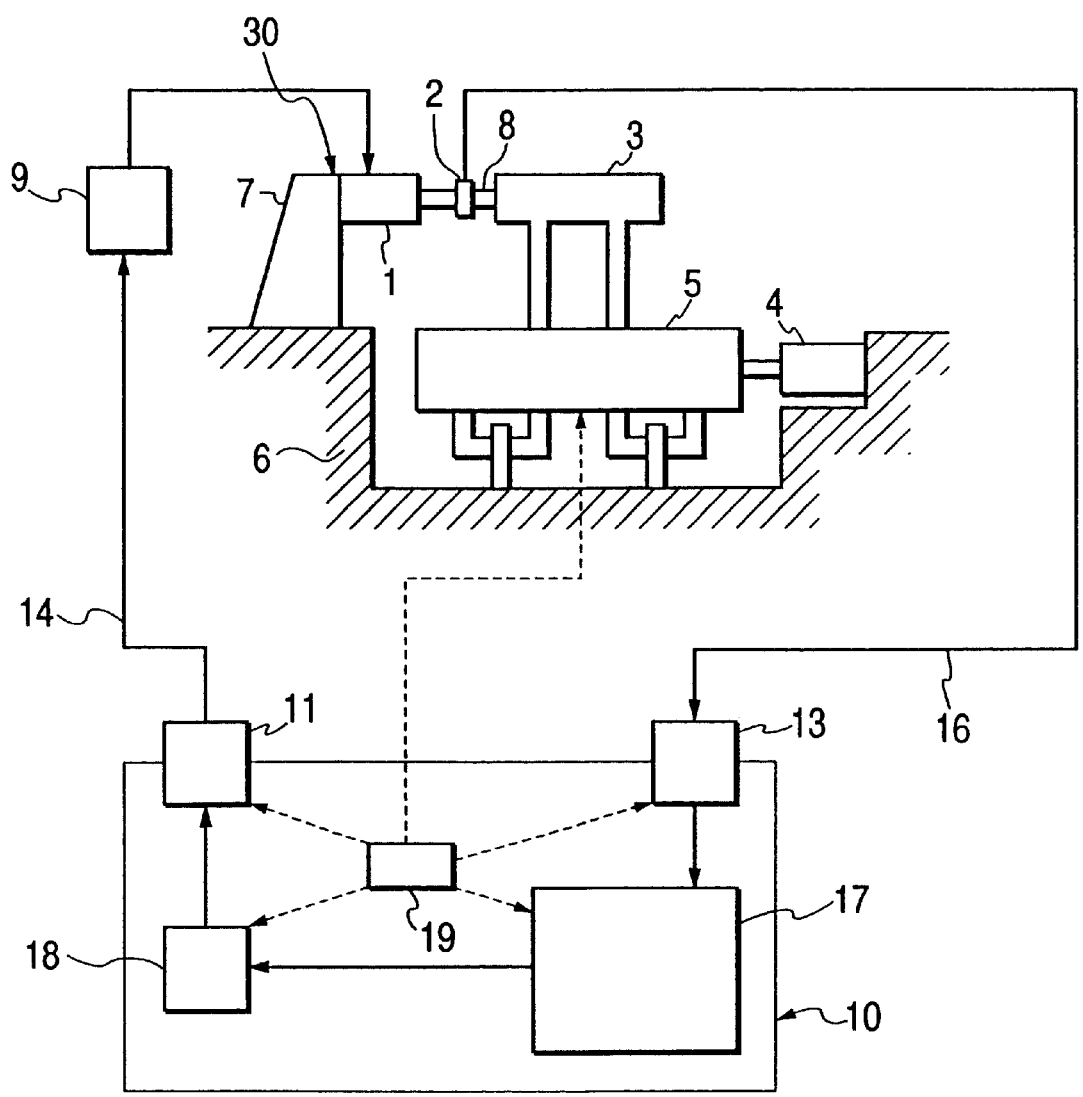

Another modification of the present invention is explained using a block diagram shown in FIG. 3. The difference between this modification and the above-mentioned embodiment is that this modification does not use an output of motion of the shaking table measured by the shaking table motion measuring device 4 for the control of the actuator 1. Accordingly, the motion of the shaking table must be simulated by any suitable forms. In this modification, the wave form of the motion of the shaking table is preliminarily stored by an auxiliary device of the digital computer such as memory means.

By combining the condition of the relative motion between the numerical model calculated by the digital computer 10 and the shaking table and a preliminarily inputted wave form of the motion of the shaking table, the condition of the motion of the numerical model relative to the foundation 6 after a predetermined period from the time when the reaction force is measured is obtained. Although, in FIG. 3, a case in which the time control means 19 controls the shaking table 5 is shown, the control range of the time control means 19 may be restricted within the digital computer 10 and the time control function that the shaking table 5 has is used as time control means of an upper order.

According to this modification, a testing of a structure can be carried out by only altering the programming of structure motion calculation means and adding time signal transmission means between the shaking table and the time control means in a conventional earthquake resistance testing method for the structure which uses the conventional simulation and the numerical calculation in parallel. Accordingly, the cost for the test can be reduced and the test can be simplified.

Figure 4:
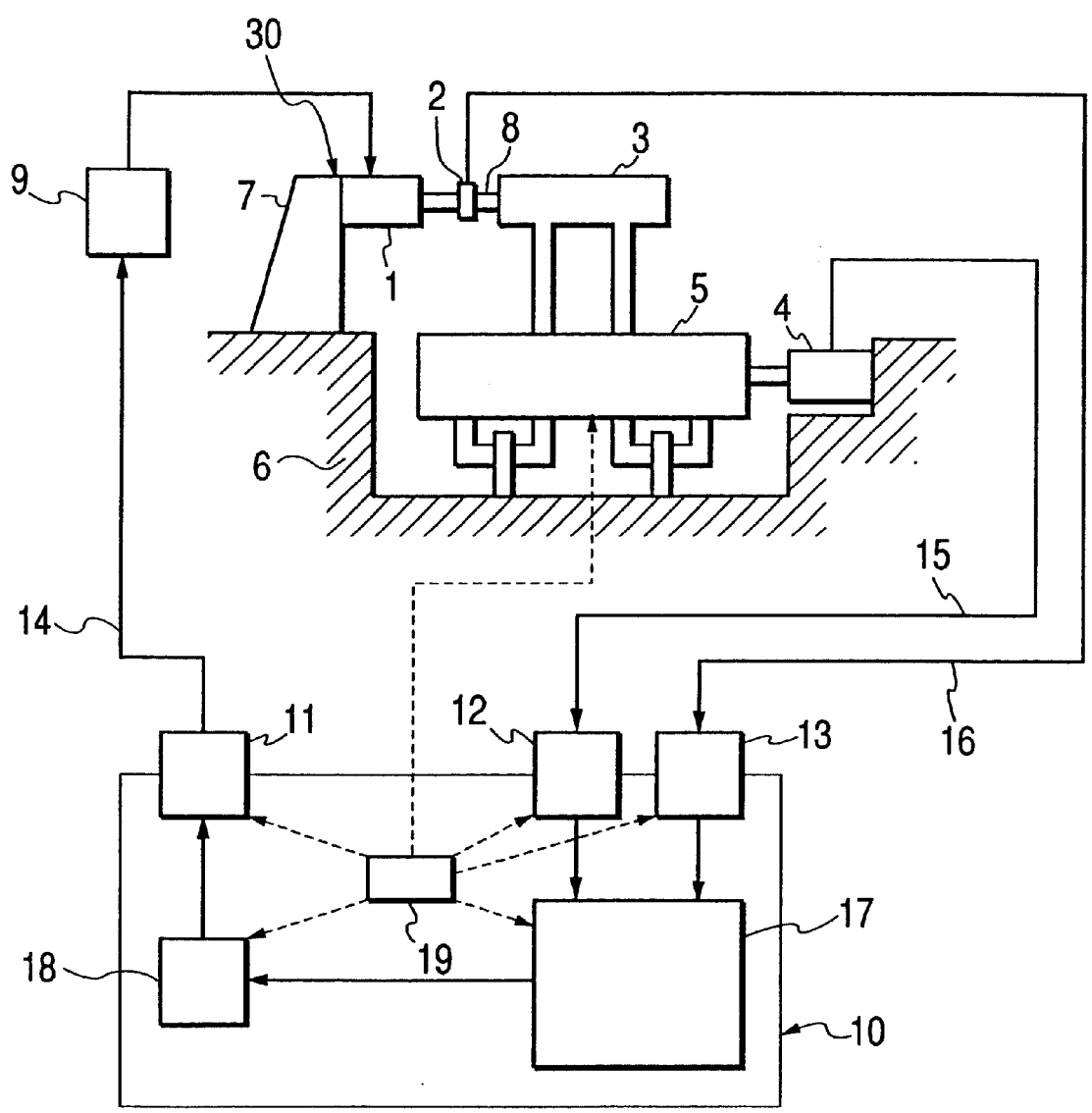

Still further modification of the present invention is explained using a block diagram shown in FIG. 4. This modification is characterized by providing the time control relationship between the shaking table and the time control means 19 shown in FIG. 1.

In the memory device of the digital computer 10, as in the case of the modification shown in FIG. 3, the numerical model and the wave form of the motion of the shaking table are stored. The condition of the motion of the shaking table relative to the foundation 6 after a predetermined period from the time when the reaction force is measured is calculated based on the condition of the relative motion of the numerical model to the shaking table which is calculated by the structure motion calculating means 17 and the time lag between the preliminarily inputted wave form of the motion of shaking table and the wave form of the measured value of the motion of the shaking table. Here, the wave form of the motion of the shaking table at the time which precedes by the time lag is obtained from the preliminarily stored wave form of the motion of the shaking table and the measured value is corrected by this value. The relationship between the shaking table 5 and the digital computer 10 is similar to that of the case shown in FIG. 3 and hence, the detailed explanation thereof is omitted. According to this modification, the calculation of the motion of the structure higher than that of the embodiment shown in FIG. 1 can be achieved.

Figure 5:
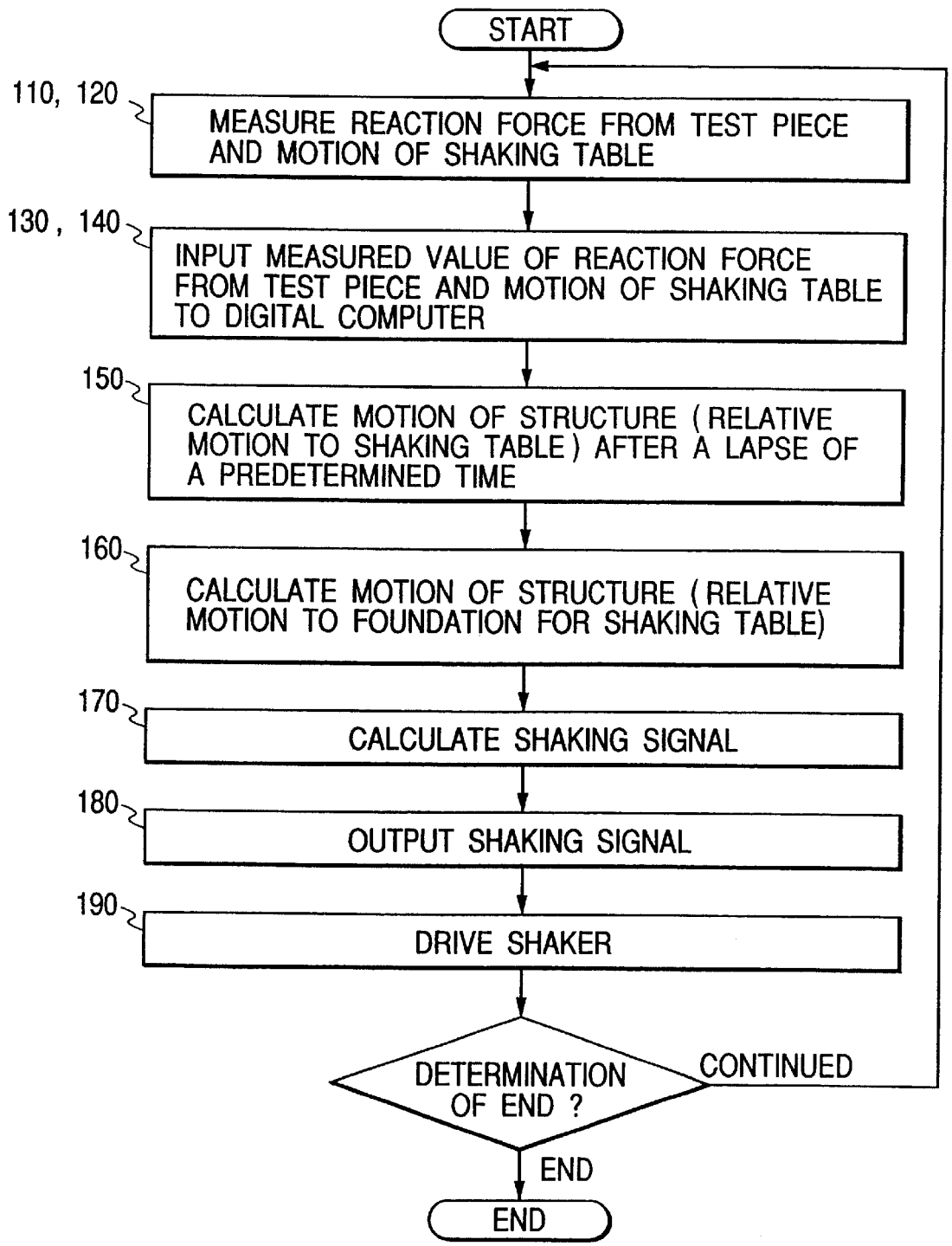
FIG. 5 is a flow chart of one embodiment of the shaking testing method of the present invention.

One embodiment and its respective modifications of the testing method for a structure which are carried out using the systems shown in the above-mentioned embodiment and its respective modifications are explained in detail in conjunction with FIG. 5 and ensuing drawings. FIG. 5 is shows an embodiment which uses the testing system for the structure shown in FIG. 1. In this embodiment, an earthquake resistance test of a structure is carried out in accordance with following steps.

- (1) First of all, the actuators 31 or the like for the shaking table 5 shake the test piece structure 3. The reaction force generated by the test piece structure 3 is measured by the reaction force measuring device 2 (step 110).
- (2) Simultaneously, the displacement of the shaking table 5 is measured by the shaking table motion measuring device 4 (step 120).
- (3) Subsequently, the reaction force value measured by the reaction force measuring device 2 in the step 110 is inputted to the digital computer 10 (step 130).
- (4) The displacement of the shaking table measured by the shaking table motion measuring device 4 in the step 120 is inputted to the digital computer 10 (step 140).
- (5) Based on the numerical model of the structure preliminarily inputted to the digital computer 10, the structure motion calculating means 17 calculates the motion of the structure after a predetermined period from the time when the reaction force is measured using the reaction force value measured in the step 110. Here, the structure is comprised of the numerical model and the test piece structure 3, while the motion means the relative motion between the structure and the shaking table 5 (step 150).
- (6) The structure motion calculating means 17 adds the measured value of the displacement of the shaking table obtained in the step 140 to the motion of the structure obtained in the step 150 and calculates the motion of the structure after a predetermined period from the time when the reaction force is measured. Here, the motion means the motion of the shaking table 5 relative to the foundation, namely, the absolute displacement (step 160).
- (7) Based on the calculated result of the motion of the structure obtained in the step 160, the shaking signal calculating means 18 calculates a shaking signal for the actuator 7 which is necessary for obtaining the condition of the motion to be made by the simulated structure 30 (step 170).

The signal output device 11 outputs the shaking signal obtained in the step 170 after a predetermined period (step 180).

- (8) Based on the shaking signal outputted from the signal output device 11, the controller 9 drives the actuator 1 (step 190).
- (9) Here, the completion or the end of the shaking test for a structure is determined whether a preliminarily set time has lapsed or not or whether a stop signal is given to the actuator controller or not. This determination means may be incorporated in the digital computer 10 or the actuator controller 9 or may be provided as a separate device.

According to this embodiment, due to the combined use of the shaking test of the partial structure and the numerical calculation using the numerical model, the earthquake resistance test for a structure becomes possible without mounting the actuator on the shaking table and hence, the entire space of the shaking table can be effectively used. Accordingly, the ratio between the mounting area for the partial structure and the area of the shaking table can be made as close as possible to 1.

Figure 6:
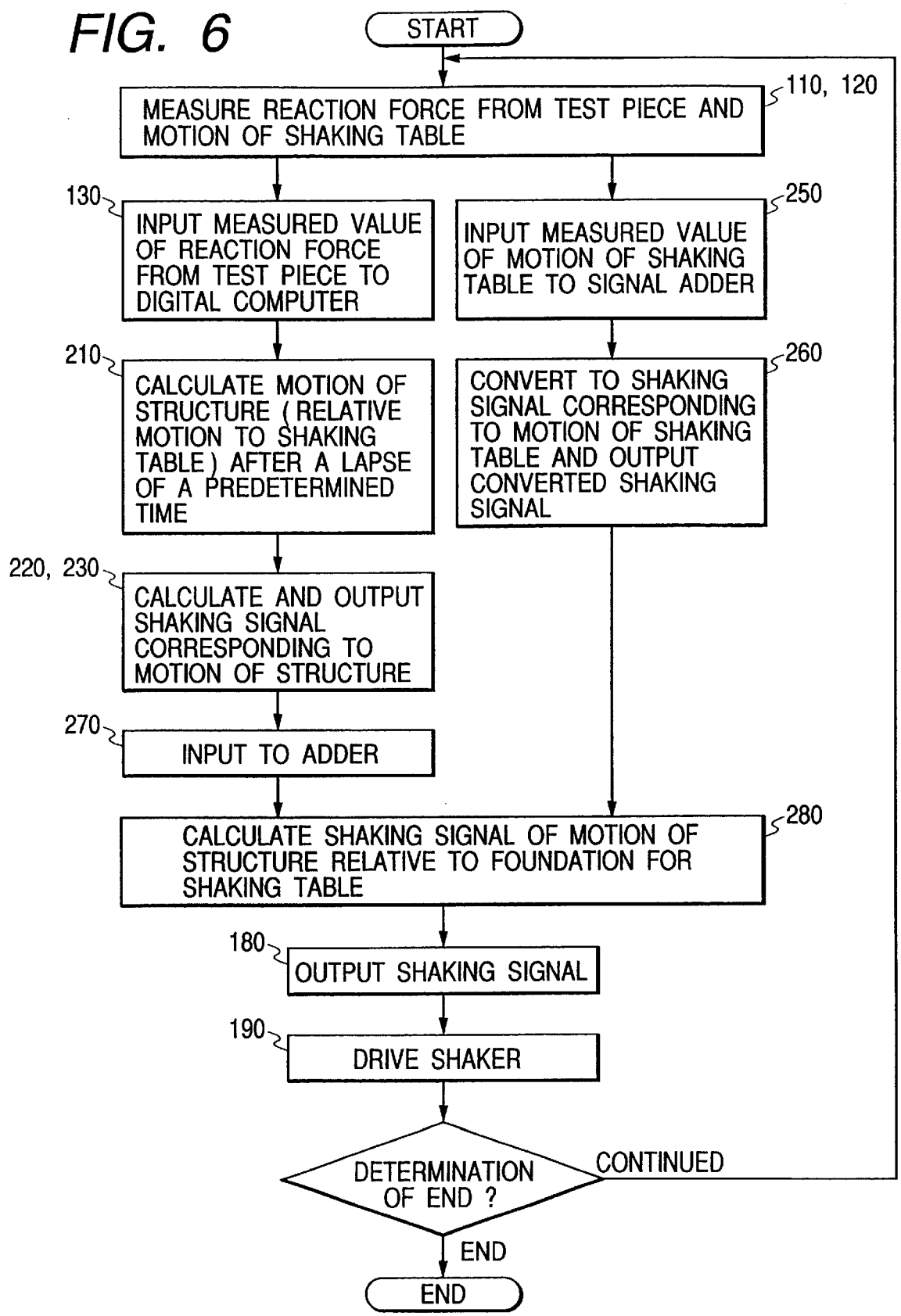
FIG. 6 to FIG. 8 are flow charts of the modifications thereof.

Subsequently, the modification of the testing method for a structure using the testing system for a structure shown in FIG. 2 is explained in view of FIG. 6. This testing method differs from the above-mentioned embodiment in that the displacement of the shaking table 5 and the displacement of the actuator 7 are separated. To be more specific, In the testing method shown in FIG. 5, the steps 150–170 are replaced with the following steps 210–230 and steps 270, 280 and steps 250, 260 are added.

- (5a) Based on the numerical model of the structure preliminarily inputted to the digital computer 10, the motion of the structure after a predetermined period from the time when the reaction force is measured is calculated using the reaction force value measured in the step 110. Here, the motion of the structure means the relative motion between the structure and the shaking table 5 (step 210).
- (6a1) From the calculated result of the motion of the structure obtained in the step 210, the shaking signal calculating means 18 calculates a shaking signal for the actuator 1 necessary for obtaining the condition of the motion to be made on the simulated structure 30 after a predetermined period (step 220).
- (6a2) The signal output device 11 outputs the shaking signal obtained in the step 220 after the predetermined period (step 230).

Furthermore, parallel to the above-mentioned steps for shaking the test piece structure, steps for controlling the displacement of the shaking table 5 are carried out.

- (4a1) The measured value of the displacement of the shaking table obtained in the step 120 is inputted to the adder 21 by way of the signal transmission means 15 (step 250).
- (4a2) In the adder 21, based on the displacement of the shaking table measured by the shaking table motion measuring device 4, a second shaking signal for shaking the shaking table after the predetermined period is obtained and the adder 21 outputs this second shaking signal (step 260).
- (6a3) A first shaking signal of the structure obtained by the digital computer 10 is inputted to the adder 21 (step 270).
- (7a) The first shaking signal of the structure obtained by the digital computer 10 and the second shaking signal are combined in the adder 21 and are converted to a third shaking signal (step 280).

According to this modification, while using the conventional shaking table without any change, due to the combination of the shaking test of the partial structure and the numerical calculation of the numerical model, the earthquake resistance test for a structure can be carried out with a high precision.

Figure 7:
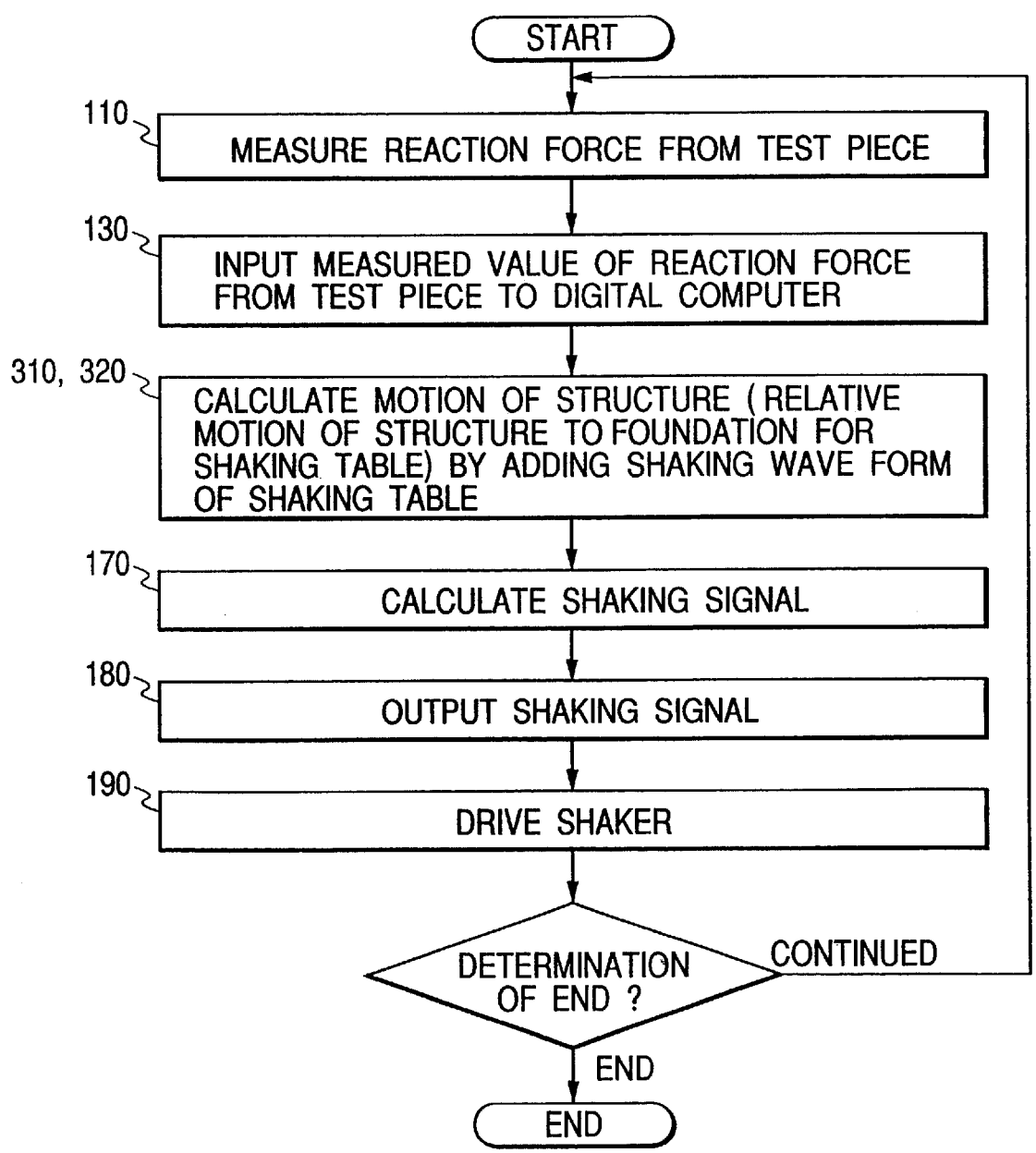

The modification of the testing method for a structure using the testing system for a structure shown in FIG. 3 is explained in view of FIG. 7. This testing method differs from the above-mentioned modification shown in FIG. 5 in that the method does not use the output of the shaking motion measuring device. Namely, the motion of the shaking table 5 is stored in memory means and based on this stored motion, the time control means 19 controls the motion of the shaking table 5. Accordingly, in the steps 110–160 of the first shaking test embodiment, the steps 120 and 140 are omitted and the steps 150 and 160 are changed to the following steps 310, 320.

(5b) With respect to the numerical model of the structure which is prestored in the digital computer 10, the structure motion calculating means 17 calculates the relative motion of the structure to the shaking table after a lapse of a predetermined period from the time when the reaction force is measured (step 310).

(6b) By adding a preliminarily stored or inputted shaking wave form of the shaking table to the calculated result of the motion of the structure obtained in the step 310 using the structure motion calculating means 17, the motion of the structure relative to the foundation for the shaking table after the predetermined period from the time when the reaction force is measured is calculated (step 320).

Thereafter, the step 170 and ensuing steps are carried out. According to this modification, in addition to the advantage of the embodiment of the first testing method, by merely adding the signal transmission means for performing the time control between the shaking table and the digital computer to the conventional shaking table and altering the programming related to such an addition, an earthquake resistance test of a large-scaled structure can be carried out using the simple numerical model and the partial structure.

Figure 8:
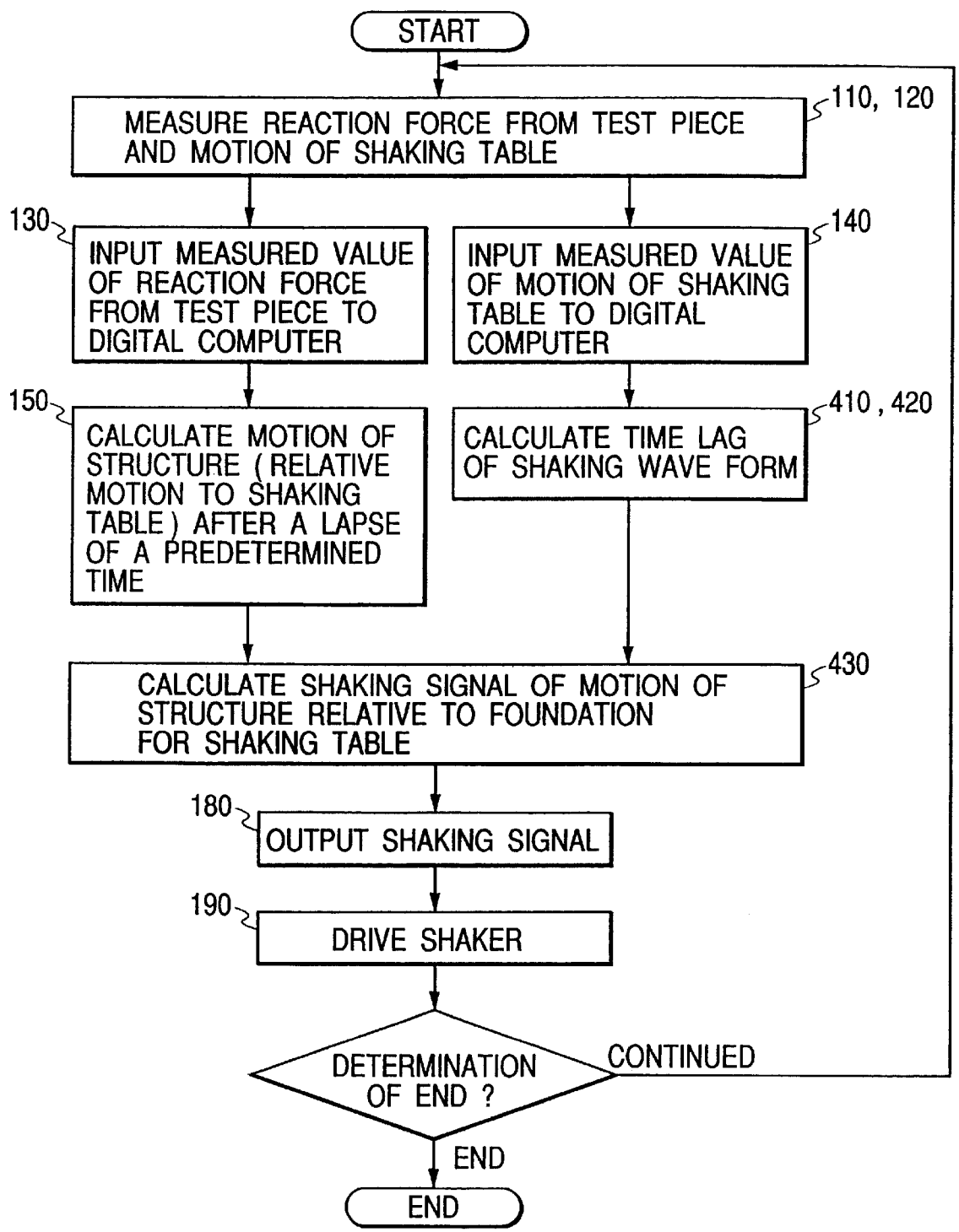

The modification of the testing method for a structure using the testing system for a structure shown in FIG. 4 is explained in view of FIG. 8. This testing method is characterized by adding a time control of the shaking table to the testing method shown in FIG. 5. Namely, in place of the step 160, steps 410–430 are carried out.

(6c1) Based on the shaking wave form of the shaking table which is preliminarily inputted to the digital computer 10, the displacement of the shaking table after a predetermined period from the time when the reaction force is measured is obtained. By combining this value and the calculated result of the relative motion of the structure after the predetermined period, the structure motion calculating means calculates the motion of the structure relative to the foundation for the shaking table after the predetermined period (step 410).

(6c2) By comparing the preliminarily inputted shaking wave form of the shaking table with the measured value measured by the shaking table displacement measuring means 4, the structure motion calculating means calculates the time lag between the wave form obtained by plotting the measured values measured by the shaking table displacement measuring means 4 at a predetermined time interval and the shaking wave form of the shaking table (step 420).

(6c3) Based on the time lag obtained in the step 420, the time control means 19 adjusts the predetermined time interval from the time when the reaction force is measured necessary for calculating the absolute displacement of the structure, and renews the predetermined time interval (step 430).

According to this testing method, an earthquake resistance test can be carried out with a higher precision.

Although the actuator 1 is described as an actuator having one-dimensional excitation capability in any one of the above-mentioned testing methods, it is needless to say that the actuator 1 may be an actuator having two or more-dimensional excitation capability. Furthermore, the shaking direction of the shaking table may be either one horizontal direction or two horizontal directions, or the shaking may be generated by applying impacts on the shaking table. Still furthermore, the predetermined period can be a fixed time or a value calculated by the computer.

Figure 9:
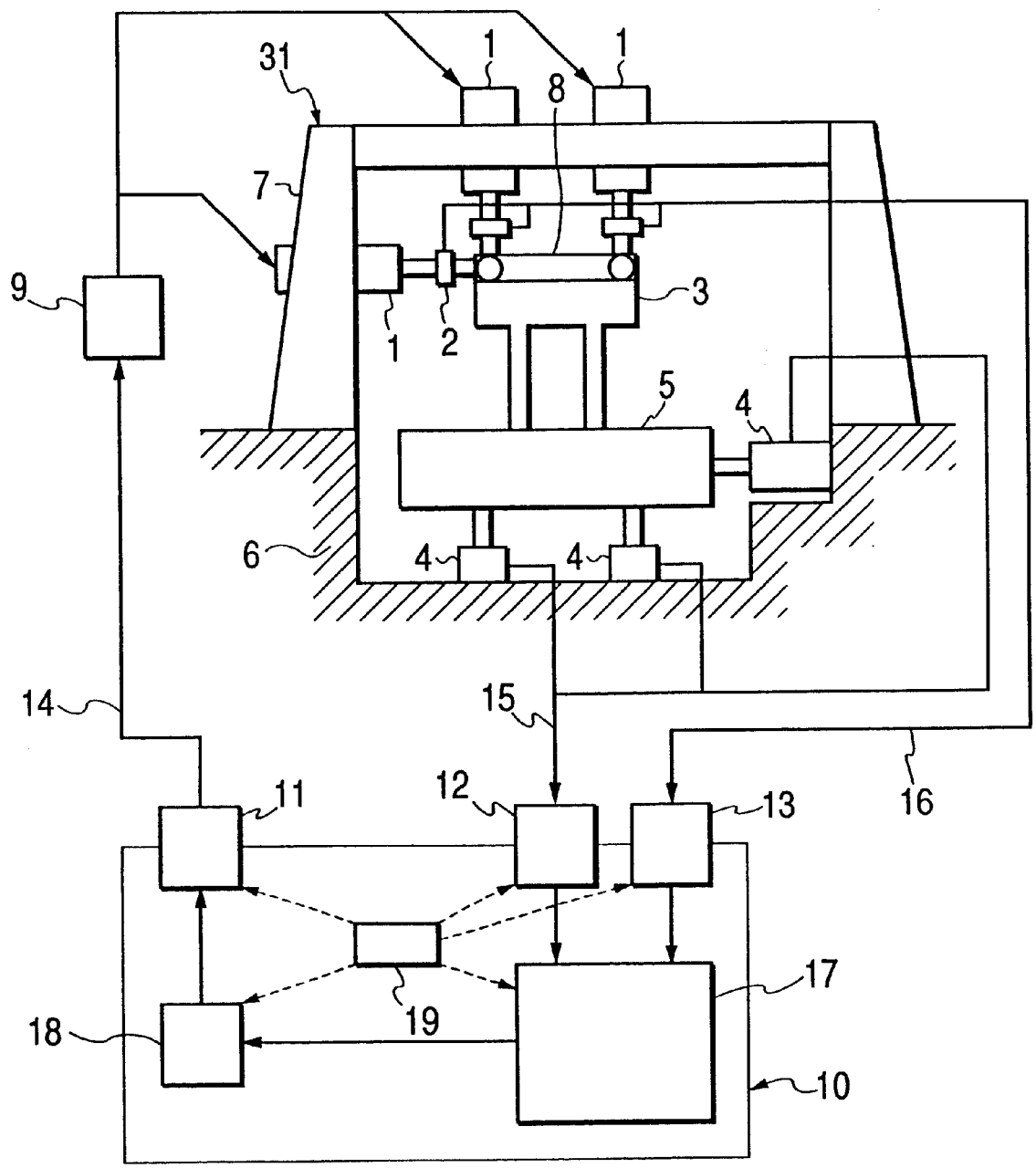
FIG. 9 is a schematic view of one embodiment of the shaking testing system of the present invention showing the surroundings of the test piece structure in detail.

Furthermore, in FIG. 9, a case where the structure is shaken by a plurality of actuators is shown. The test piece structure 3 is mounted on the shaking table 5 and is shaken in vertical directions by two actuators 1, and in a horizontal direction by one actuator 1. Although not shown in drawings, the shaking table 5 is provided with shaking means in respective directions for enabling the shaking of the shaking table 5 in vertical directions as well as in horizontal directions. As mentioned previously, the reaction forces applied to the actuators 1, from the test piece structure 3 are measured by the reaction force measuring device 2, while the motion of the shaking table 5 is measured by the shaking table motion measuring device 4. The construction of other components or parts is the same as that of the above mentioned embodiments and modifications and hence, the detailed explanation is omitted. According to this embodiment, since the structure is shaken with a plurality of degrees of freedom using a plurality of actuators and hence, more actual or realistic simulation test can be carried out. Although the part which constitutes the numerical model is omitted in FIG. 9, it is needless to say that a so-called hybrid shaking test is carried out using the numerical model.

Although respective embodiments and respective modifications of the present invention have been explained heretofore, the present invention substantially can take various forms within its scope without departing from the gist of the invention. Accordingly, the previously mentioned embodiments and modifications are simply illustrations of the present invention in any aspects and they should not be construed to limit the present invention. Furthermore, modifications which belong to a scope of equivalence of the claims fall within the scope of the present invention.

According to the present invention, when the partial structure mounted on the shaking table is shaken by the shaking table and the actuators which are fixedly mounted on the foundation on which the shaking table is also mounted, the shaking response of the structure made of the partial structure and the numerical model virtually connected to the partial structure is calculated by the digital computer and the calculated result is made by the shaking table and the actuator and hence, the test of the large-sized test piece structure which makes full use of the size of the shaking table can be carried out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A testing system for testing a structure comprised of a partial structure and a numerical model virtually connected to the partial structure, the testing system comprising: a shaking table on which the partial structure is mounted, a simulated structure including at least one actuator for shaking the partial structure and means for measuring a reaction force that the simulated structure receives from the shaken partial structure, and a digital computer which calculates a motion of the numerical model based on a measured value of the reaction force measuring means, and which generates a shaking signal based on the calculated result for at least one actuator, the shaking table and the simulated structure being mounted on a common foundation.

2. A testing system for a structure comprising: a shaking table mounted on a foundation by way of a first actuator; a simulated structure having at least one second actuator fixedly mounted on the foundation; a reaction force measuring device to measure a reaction force generated by a test piece structure connected to the simulated structure; a digital computer which stores a numerical model that is virtually connected to the test piece structure; a controller to control the simulated structure, and a shaking table motion measuring device to measure motion of the shaking table.

3. A testing system for a structure according to claim 2, wherein the digital computer outputs a control signal based on outputs of the shaking table motion measuring device and the reaction force measuring device to the controller.

4. A testing system for a structure according to claim 2, wherein the digital computer calculates motion of said test piece structure based on outputs of the reaction force measuring device and the numerical model, the test system further comprising an adder which adds the calculated motion result and the output of the shaking table motion measuring device, and outputs an added result to the controller.

5. A testing method for testing a structure comprised of a partial structure and a numerical model virtually connected to the partial structure comprising: mounting the partial structure on a shaking table and shaking the partial structure with an actuator which is fixedly mounted on a foundation on which the shaking table is mounted; measuring a reaction force generated by the shaken partial structure and a displacement of the shaking table; obtaining a motion of a joint between the numerical model and the partial structure after a predetermined period from time to time when the reaction force is measured, the obtained motion being based on the measured values of the shaking table; and inputting a shaking signal to the actuator for making the obtained motion at the joint after the predetermined period, the actuator shaking the partial structure based on the signal.

6. A testing method for testing a structure made of a test piece mounted on a shaking table and a numerical model virtually connected to the test piece and stored in a digital computer, comprising:

shaking the test piece not only by shaking the shaking table but also with an actuator fixedly mounted on a foundation on which the shaking table is mounted;

measuring a reaction force generated by the test piece structure;

measuring a displacement of the shaking table;

inputting the measured value of the reaction force to the digital computer;

inputting the measured displacement of the shaking table to the digital computer;

calculating a relative motion of the structure to the shaking table after a predetermined period from a time when the reaction force is measured, from the measured value of the reaction force with reference to the numerical model;

calculating a relative motion of the structure to the foundation of the shaking table after the predetermined period from the time when the reaction force is measured, by adding the calculated result of the relative motion of the structure and the measured value of the displacement of the shaking table;

calculating a shaking signal to generate the relative motion obtained by the calculation of the previous calculation step; outputting the shaking signal after the predetermined period from the time when the reaction force is measured; and driving the actuator based on the shaking signal.

7. A testing method for a structure made of a test piece mounted on a shaking table and a numerical model virtually connected to the test piece and stored in a digital computer comprising:

shaking the test piece using the shaking table and an actuator fixedly mounted on a foundation on which said shaking table is mounted; measuring a reaction force generated by the test piece and inputting the measured reaction force to the digital computer while a relative motion between the test piece and the shaking table after a predetermined period from the time when the reaction force is measured is calculated using the measured value of the reaction force with reference to the numerical model; calculating a relative motion between test piece and the foundation for the shaking table after the predetermined period from the time when the reaction force is measured, by adding the calculated result of the relative motion of the test piece and a preliminary obtained displacement of the shaking table; obtaining a shaking force to be given to the test piece for making the calculated motion after the predetermined period; and generating the shaking force by the actuator.

8. A testing method for a structure according to claim 7, further including measuring a displacement of the shaking table at the time of measuring the reaction force and using the measured displacement as the preliminarily obtained displacement.

9. A testing method for a structure according to claim 7, further including prestoring the preliminary obtained displacement of the shaking table in the digital computer.

* * * * *